United States Patent [19]

Maeda et al.

[11] Patent Number: 5,768,245
[45] Date of Patent: Jun. 16, 1998

[54] OPTICAL DISK APPARATUS

[75] Inventors: Miyozo Maeda; Yoshiyuki Nanba; Takehiko Numata, all of Kawasaki, Japan

[73] Assignee: Fujitsu Limited, Kawasaki, Japan

[21] Appl. No.: 332,384

[22] Filed: Oct. 28, 1994

[30] Foreign Application Priority Data

Dec. 27, 1993 [JP] Japan ..................... 5-330659

[51] Int. Cl.$^6$ ........................................ G11B 7/00
[52] U.S. Cl. .............................. 369/116; 369/54
[58] Field of Search ................... 369/54, 58, 116, 369/109, 110, 48, 47

[56] References Cited

U.S. PATENT DOCUMENTS

| 5,007,039 | 4/1991 | Sakemoto et al. ............... 369/116 |
| 5,400,309 | 3/1995 | Satomura ....................... 369/48 X |

FOREIGN PATENT DOCUMENTS

| 60-157729 | 8/1985 | Japan . |
| 1-134725 | 5/1989 | Japan . |
| 3-283021 | 12/1991 | Japan . |

*Primary Examiner*—Muhammad N. Edun
*Attorney, Agent, or Firm*—Greer, Burns & Crain, Ltd.

[57] ABSTRACT

Marks are recorded on an optical disk which is rotated at a constant rotational speed by laser light which is converged on a substantially circular spot. The pulse width of a recording pulse is set at a sufficiently narrow value and the recording power of the laser light is maintained at a constant value. Marks (corresponding to "1") are recorded on the entire disk surface by the laser light with the same recording pulse width and with the same recording power. The recording pulse width is less than about 30% of the mark interval obtained when they are recorded on the optical disk at the highest density. The recording power is set at the value which produces the maximum reproduction amplitude when said marks are recorded on the optical disk at the highest density.

19 Claims, 17 Drawing Sheets

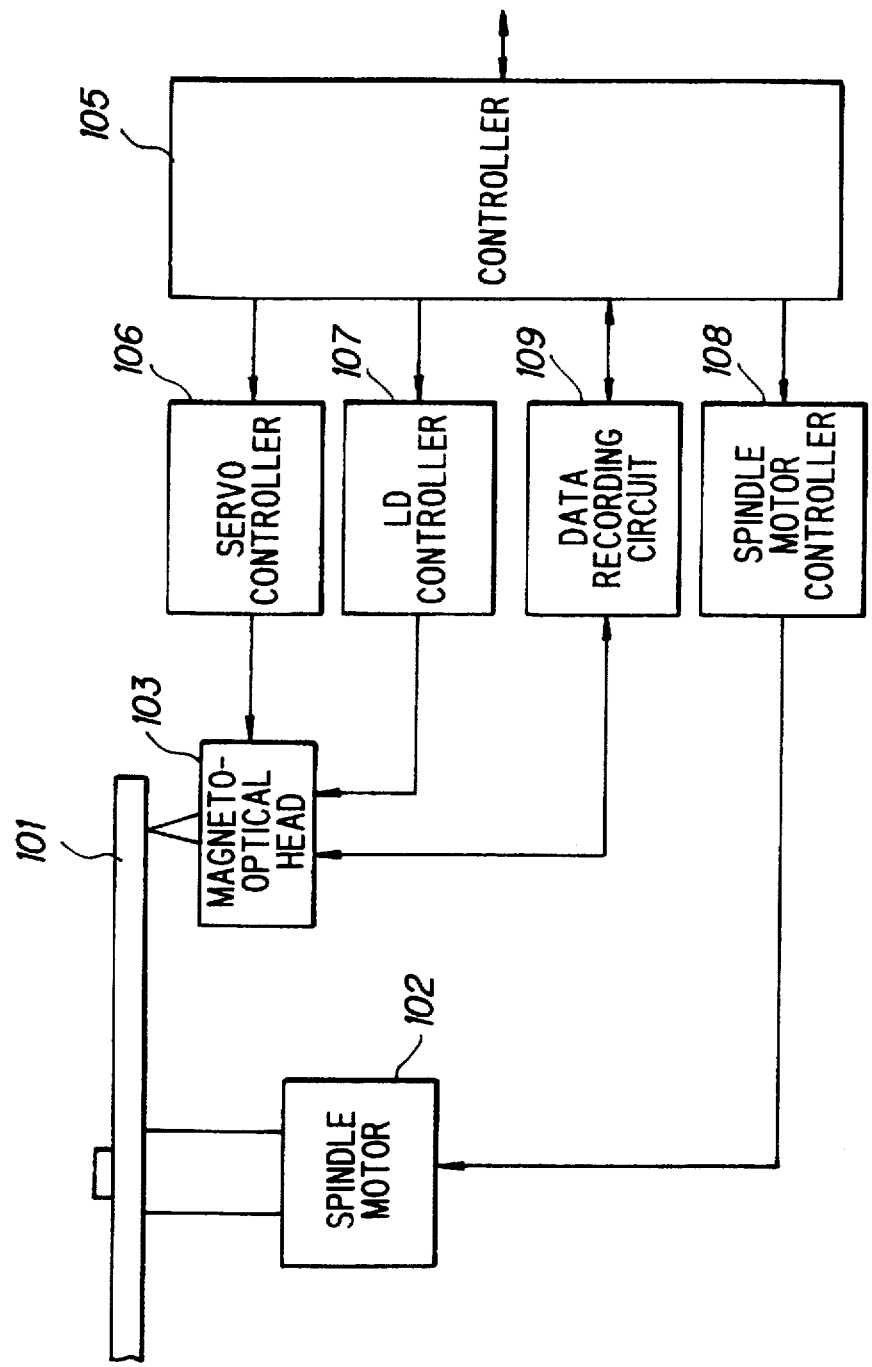

FIG.5A (PRIOR ART)
FIG.5B (PRIOR ART)
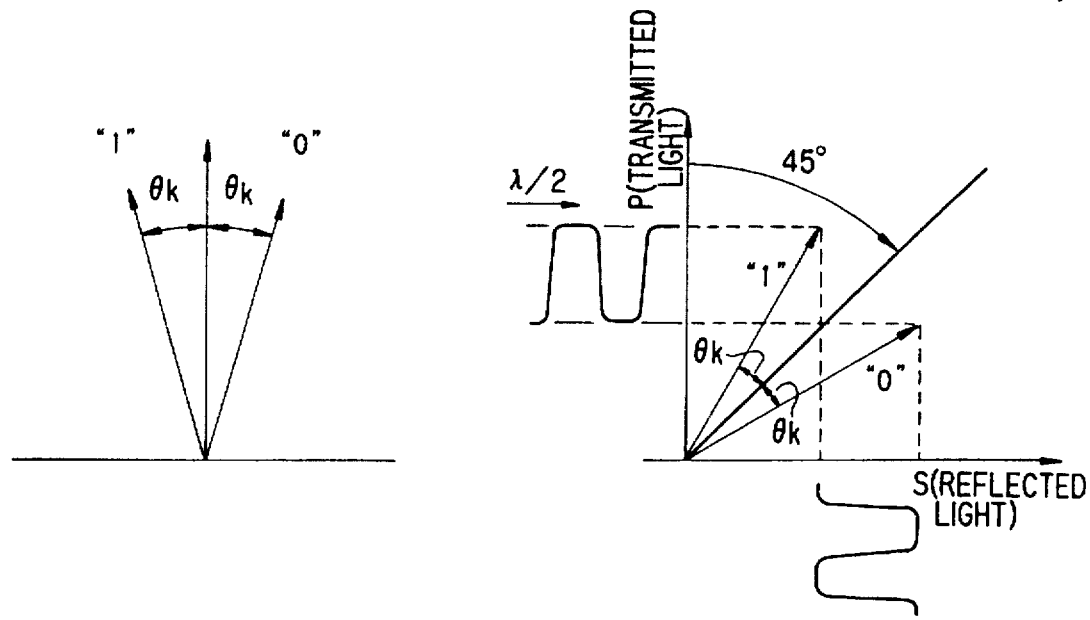
FIG.5C (PRIOR ART)
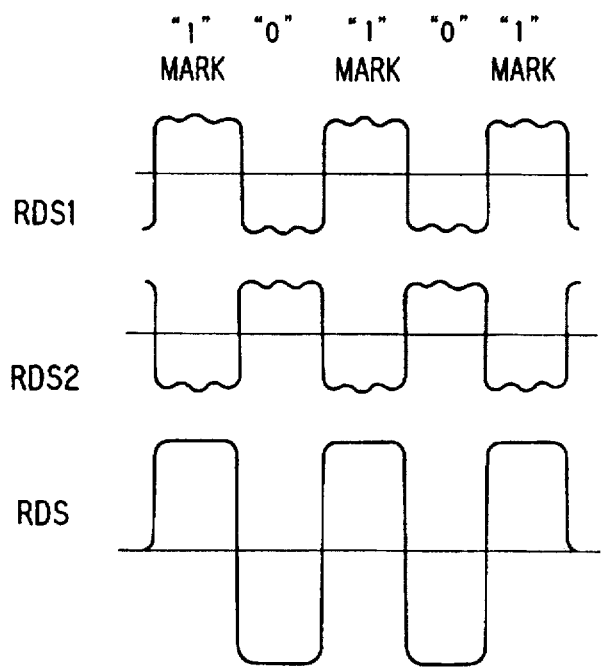

F I G. 9

| TIME CORRESPONDING TO PULSE WIDTH (ns) | AMOUNT OF MOVEMENT OF MEDIUM AT LINEAR VELOCITY OF 9 M/S (μm) | AMOUNT OF MOVEMENT OF MEDIUM AT LINEAR VELOCITY OF 15 M/S (μm) | DIFFERENCE IN AMOUNT OF MOVEMENT BETWEEN LINEAR VELOCITIES OF 9 M/S AND 15 M/S (μm) |
|---|---|---|---|
| 15 | 0.135 | 0.225 | 0.090 |
| 25 | 0.225 | 0.375 | 0.150 |
| 35 | 0.315 | 0.525 | 0.210 |
| 45 | 0.405 | 0.675 | 0.270 |
| 55 | 0.495 | 0.825 | 0.330 |

FIG. 11

| | | THICKNESS |
|---|---|---|
| 11f | RESIN PROTECTIVE FILM (ULTRAVIOLET-CURING RESIN) | 10 μm |
| 11e | REFLECTIVE FILM (Al) | 30 nm |
| 11d | DIELECTRIC FILM (SiN) | 30 nm |
| 11c | PERPENDICULAR MAGNETIC THIN FILM (TbFeCo) | 30 nm |
| 11b | DIELECTRIC FILM (SiN) | 90 nm |
| 11a | SUBSTRATE (POLYCARBONATE RESIN) | 1.2 mm |

OPTICAL DISK APPARATUS

BACKGROUND OF THE INVENTION

1. Field of the Invention

The present invention relates to an optical disk apparatus and, more particularly, to an optical disk apparatus for recording marks on the same conditions from the inner peripheral portion to the outer peripheral portion thereof.

2. Description of the Related Art

Optical disks have recently been developed and being put to practical use as an external storage unit of a computer. As optical disks are known magneto-optical type optical disks, phase change type optical disks and organic type optical disks. In such a magneto-optical disk, a semiconductor laser is converged on a minute spot having a diameter of about the wavelength so as to record data on a medium. The magneto-optical disk is mainly characterized by the large recording capacity and the interchangeability. Especially, 5-inch and 3.5-inch optical disk apparatuses standardized by the ISO are expected to be widely used from high-faculty work stations to personal computers.

A rewritable magneto-optical disk is produced by coating the surface of a disk with an amorphous magnetic film such as a TbFeCo thin film. Such a disk utilizes the nature of a magnetic film that the coercive force thereof necessary for magnetization inversion reduces in conformity with the rise in the temperature (the coercive force is 0 at the Curie point). In other words, after irradiating the disk medium with a laser beam in order to raise the temperature of the disk medium to the vicinity of 200° C. so as to reduce the coercive force, a weak magnetic field is applied to the disk medium, thereby controlling the direction of magnetization so as to record or delete information. As shown in FIG. 2A, if an upward magnetic field is applied to a magnetic film 5 by a coil 6 when the direction of magnetization of the magnetic film 5 is down, and the portion of the magnetic film 5 at which the direction of magnetization is to be inverted is irradiated with the laser beam LB through the objective lens OL, as shown in FIG. 2B, the direction of magnetization at this portion reverses, i.e., is pointed upward, thereby enabling the recording of information. At the time of reading information, if the magnetic film 5 is irradiated with the laser beam LB having a polarization plane in the direction of the y-axis, as shown in FIG. 2C, reflected beam LBO with the polarization surface rotated clockwise by $\theta_k$ due to the magnetic Kerr effect is obtained at the portion in which the direction of magnetization is down, while reflected beam LB1 with the polarization surface rotated counterclockwise by $\theta_k$ due to the magnetic Kerr effect is obtained at the portion in which the direction of magnetization is up. It is therefore possible to read the direction of magnetization and, hence, information by detecting the polarized state of the reflected beam.

FIGS. 3A and 3B explain the structure of a 3.5-inch optical disk, wherein FIG. 3A is a schematic plan view and FIG. 3B a schematic partially sectional view thereof.

A magneto-optical disk 11 is provided with 10,000 spiral tracks per side, and the whole tracks are separated into 25 fan-shaped sectors in case of 3.5 inch magneto-optical disk with memory capacity of 128 MB. Each sector ST is composed of, for example, 512 bytes, and an address field AF (ID region) is provided at the head portion and a data filed DF (MO region: magneto-optical region) is provided at the remaining portion. Address information such as sector mark, VFO pattern for clock extraction, address mark, track address and sector address is recorded in the address filed AF, and VFO pattern for clock extraction, synchronous byte SYN for phase adjustment and data DATA are stored in the data field DF. A defect management area DMA is provided on the inside and the outside of the accessible region (storage region), and an inner control track and outer control track TRc are provided on the innermost peripheral portion and the outermost peripheral portion of the accessible region.

As shown in FIG. 3B, the magneto-optical disk 11 is composed of a transparent plastic substrate (substrate) PLS, a recording layer (magnetic film) MGF coating the transparent plastic substrate PLS, and a protective layer PRF formed on the recording layer MGF. The address field AF (ID region) is preformatted with pits PT by stamping.

The data being recorded are modulated into the data having a format (RLL (2, 7) code) appropriate to the recording characteristic of the magneto-optical disk 11, and marks are recorded on the disk 11 at the positions corresponding to the bit "1" of the modulated data. The RLL (2, 7) code is a code in which the number of "0"s inserted between bits "1" and "1" changes from 2 to 7, and the input data are coded as follows:

| Input data | RLL (2, 7) code |
|---|---|
| (1) 10 | 0100 |
| (2) 010 | 100100 |
| (3) 0010 | 00100100 |
| (4) 11 | 1000 |
| (5) 011 | 001000 |
| (6) 0011 | 00001000 |
| (7) 000 | 000100 |

The portion of "1" is marked and the portion "0" is not marked, and in the patterns (2) and (3), in other words, when the number of "0"s inserted between "1" and "1" is 2, the density of the mark is the highest. Data may be modulated into the data having an RLL (1, 7) code in place of the RLL (2, 7) code. The recording pattern having the high density changes in accordance with the recording modulation system.

FIG. 4 shows the fundamental structure of a recording/reproducing head (magneto-optical head) of a magneto-optical disk apparatus. In FIG. 4, the reference numeral $21_1$ represents a semiconductor laser (laser diode), $21_2$ a collimation lens, $22_3$ a roundness correction prism, $21_4$ a beam splitter for transmitting the light from the semiconductor laser $21_1$ and reflecting the light reflected from the disk (not shown) toward the signal reflection side, $21_5$ a reflecting mirror for guiding light toward the disk (not shown), and $21_6$ a two-dimensional actuator provided with an objective (not shown), a tracking coil and a focusing coil (not shown) for finely adjusting the objective in the directions of tracking and focusing, respectively, a bias coil (not shown), etc. The reference numeral $21_7$ represents a reflecting mirror for guiding reflected light toward the data detection side, and $21_8$ a half wavelength plate for rotating the polarization plane of incident light by 45 degrees so that the ratio of the quantity of light transmitted through a polarization beam splitter at a latter stage and the quantity of light reflected thereby is nearly 1:1. The reference numeral $21_9$ denotes a converging lens, $21_{10}$ a polarization beam splitter, $21_{11}$ a P-wave component detector, and $21_{12}$ an S-wave component detector. The polarization beam splitter $21_{10}$ transmits the light (P-wave component) which is parallel to the plane of incidence and reflects the light (S-wave component) which is perpendicular to the plane of incidence.

It is therefore possible to detect the polarization state of incident light as a change in the quantity of transmitted light and the quantity of reflected light. The polarization plane of returned light is rotated by $\theta_k$ clockwise or counterclockwise due to the magnetic Kerr effect in accordance with the direction of magnetization (whether the information bit is "0" or "1") at the reading portion of the ROM region 11a, as shown in FIG. 5A and is rotated by 45 degrees by the half wavelength plate $21_8$. Therefore, in the P-wave component (transmitted light) and the S-wave component (reflected light) output from the polarization beam splitter $21_{10}$, when the information bit is "1" (marked), the P-wave component is larger than the S-wave component, and while when the information bit is "0" (not marked), the P-wave component is smaller than the S-wave component, as shown in FIG. 5B. Consequently, a signal RDS1 shown in FIG. 5C is output from the P-wave component detector $21_{11}$, and a signal RDS2 (having the opposite polarity to that of the signal RDS1) shown in FIG. 5C is output from the S-wave component detector $21_{12}$. By inputting these signals RDS1, RDS2 into a differential amplifier, a reproduction signal RDS of the same phase is obtained with noise removed therefrom.

Information is recorded in the preformat region (ID region) by stamping pits, and the direction of magnetization is fixed either upward or downward. The polarization plane of the returned light from the preformat portion is therefore constantly rotated by $\theta_k$ either clockwise or counterclockwise (it is assumed to be counterclockwise here). Since laser light is diffracted in accordance with the presence or absence of a pit at the position at which data is read, the size of the returned light is changed in accordance with whether or not the position at which data is read is concave. FIG. 6 shows the returned light with the polarization surface rotated by 45 degrees by the half wavelength plate $21_8$. In this state, the signal RDS1 is output from the P-wave detector $21_{11}$ and the signal RDS2 is output from the S-wave detector $21_{12}$ with the phase differences thereof coincident with each other. As a result, it is possible to read information (pit information of a mark) in the preformat portion by calculating the sum of these signals unlike the information in the MO region.

In a conventional magneto-optical disk, the recording conditions are changed by, for example, increasing the laser power for recording or the recording pulse width (duty of the recording pulse for turning on/off the laser beam) in comparison with the distance from the center of the disk. The reason is as follows:

(1) Since the magneto-optical disk rotates at a constant rotational speed and data is recorded at a constant frequency (Hz) or a constant transfer speed (bps), the recording density is higher in the inner peripheral portion of the disk. For this reason, if data is recorded with larger power (overpower) than the optimum power, the amplitude is reduced due to the bit interference. The bit interference means that when the laser power at the time of recording is large, the bit (mark) also becomes large and the interval between the bits becomes so small that the bits cannot be neatly separated.

It is therefore necessary to record marks with power which causes no or too little bit interference to lead an error.

(2) Since the magneto-optical disk rotates at a constant rotational speed and data is recorded at a constant frequency or a constant transfer speed, the recording density is lowered in the outer peripheral portion of the disk and the interval between the bits becomes 1.6 to 2 times larger than that in the inner peripheral portion. For this reason, no bit interference is caused unlike in the inner peripheral portion. It is therefore possible to increase the amplitude of a reproduction signal in the outer peripheral portion and reducing an error at the time of reproduction by increasing the laser power at the time of recording.

(3) From the results of many experiments, it is generally considered that the laser power for recording is proportional to the X power (e.g., X=½) of the travelling speed of a medium and it becomes a common sense to increase the recording power in proportion to the distance from the center of the disk.

For these reasons, at the time of recording, a method of changing conditions in accordance with the distance from the center of the disk is conventionally adopted. However, it is difficult to continuously change the laser power or the recording pulse width in proportion to the radius of the disk. Accordingly, actually, the disk is divided into some regions in the radial direction and the recording conditions are changed in each region. For example, the disk is divided into 5 regions in the radial direction from the inner periphery to the outer periphery, and the recording power and the recording pulse width are reduced in the inner peripheral zone, and the recording power and the recording pulse width are increased in proportion to the distance from the center of the disk.

FIG. 7 shows the structure of a conventional magneto-optical disk apparatus. The reference numeral 11 represents a magneto-optical disk, 21 a magneto-optical head, 31 a spindle motor, 41a a controller for controlling the entire apparatus, 41b a servo controller for positioning the magneto-optical head 21 at a predetermined position in accordance with the instruction from the controller 41a and conducting focusing servo control and tracking servo control, 41c a laser diode controller (LD controller) for controlling the power of the laser and the recording pulse width, 41d a spindle motor controller for controlling the rotation of the spindle motor 31, 41e a data recording circuit for recording data on the magneto-optical disk 11, 41f a reproducing circuit for reproducing the data read from the magneto-optical disk 11, 41g a bias magnet, and 41g a bias magnet controller.

When the magneto-optical disk 11 is divided into five zones at an interval of about 2000 tracks in the radial direction, the recording power and the recording pulse width are stored in advance in a ROM $41_{a-1}$ of the controller 41a.

FIG. 8 shows the structure of a laser diode driving circuit provided on the magneto-optical head 21. The reference numeral 51 represents a laser diode, 52 a reading current controller, 53 a recording current controller, 54 a write switch, 55 an erasing current controller, 56 an erase switch, 57 a record signal controller and 58 an erase signal controller.

Each of the current controllers 52, 53 and 55 controls the reading current, the recording current and the erasing current, respectively. Especially, the recording current controller 53 so controls the recording current as to have the current value instructed by the LD controller 41c in accordance with the preset recording current value (laser power) LSP. The record signal controller 57 so controls the pulse width of a record signal WS as to have the preset pulse width value WPW instructed by the LD controller 41c. In other words, the record signal controller 57 outputs a record signal WS having a preset pulse width at a constant recording frequency on the basis of writing data DT when data is written (when a write gate signal WGT is on). The write switch 54 is turned on/off in accordance with the record signal WS, thereby turning on/off the laser light. The erase signal controller 58 turns on the erase switch 59 so as to erase a predetermined sector at the time of erasing (when the erase gate signal EGT is on).

When the controller 41a receives data read command from the host HST, the servo controller 41b positions the magneto-optical head 21 at the designated address, and the magneto-optical head 21 reads the record signal. The magneto-optical head 21 inputs the record signal to the data reproducing circuit 41f, and the controller 41a inputs the data to the host HST.

When the controller 41a receives data write command (write command, write data) from the host HST, the servo controller 41b positions the magneto-optical head 21 at the designated sector, and the LD controller 41c supplies the erase gate signal EGT so as to erase the designated sector. The controller 41a then judges to which zone the designated sector belongs from the track number at the ID region of the sector, reads out the preset values (recording power, pulse width) of the zone from the $ROM_{41a-1}$ and inputs the values to the LD controller 41c. The LD controller 41c inputs the write gate signal WGT, the preset pulse width value WPW and the present recording current value LSP to the laser diode driving circuit, thereby controlling the recording power and the recording pulse width. The controller 41a also outputs the write data DT from the data recording circuit 41e. The record signal controller 57 (FIG. 8) produces the record signal WS having the preset pulse width at a constant recording frequency on the basis of the write data WDT when the write gate signal WGT is on, and writes the data into the magneto-optical disk 11 by turning on/off the laser light with the preset recording power.

After the end of writing, the controller 41a positions the magneto-optical head 21 at the designated sector again, and checks whether or not the recorded data is right. If the data is correct, the controller 41a informs the host HST of the normal execution of the write command, while if the data is not correct, the controller 41a informs the host of the abnormal execution of the write command.

In such a conventional recording method, it is necessary to determine the way of dividing the disk region, to set the optimum recording power and recording pulse in each region, and to provide a hardware and a software for setting and changing those values.

In addition, according to the conventional recording method, it is necessary to obtain the region to which the designated sector belongs at the time of recording, and to determine the recording power and the recording pulse width in correspondence with the region obtained. The time required for these processings is a problem in high-speed writing.

SUMMARY OF THE INVENTION

Accordingly, it is an object of the present invention to eliminate the above-described problems in the related art and to record marks on a disk on the same conditions from the inner peripheral portion to the outer peripheral portion.

It is another object of the present invention to obviate the hardware and the software for setting and changing the recording conditions, which are necessary in the related art, thereby bringing advantages in respect of cost.

It is still another object of the present invention to enable high-speed recording under simple control.

To achieve these aims, in a first aspect of the present invention, there is provided an optical disk apparatus for rotating an optical disk at a constant rotational speed and recording marks by irradiating the disk surface with laser light so as to record information by the presence and the absence of a mark, the optical disk apparatus comprising a recording means for recording marks by the laser light with the same recording pulse width, which is sufficiently narrow, and with same recording power, which is maintained at a constant value, on the entire disk surface.

In a second aspect of the present invention, there is provided an optical disk apparatus for rotating an optical disk at a constant rotational speed and recording marks by irradiating the disk surface with laser light so as to record information by the presence and the absence of a mark, the optical disk apparatus comprising a recording means for dividing the entire disk surface of the optical disk into a plurality of zones, and recording marks by the laser light with different recording frequency in each zone and with a sufficiently narrow recording pulse width in comparison with the mark length or mark interval obtained when the marks are recorded in the innermost peripheral portion of each zone at the highest density.

Other features and advantages of the present invention will be apparent from the following description taken in conjunction with the accompanying drawings.

BRIEF DESCRIPTION OF THE DRAWINGS

FIG. 1 is a schematic explanatory view of the principle of the present invention;

FIGS. 5A to 5C explain the principle of the operation of reading the MO region information;

FIG. 9 is a table used for investigating the recording conditions;

FIG. 11 shows the structure of a magneto-optical disk medium used for a magneto-optical disk apparatus according to the present invention;

DESCRIPTION OF THE PREFERRED EMBODIMENTS (A) Schematic structure of the invention FIG. 1 is a schematic explanatory view of the principle of the present invention. The reference numeral 101 represents an optical disk such as a magneto-optical disk, 102 a spindle motor, 103 a magneto-optical head, 105 a controller for controlling the entire apparatus, 106 a servo controller for positioning the magneto-optical head 103 at a predetermined position in accordance with the instruction from the controller 105 and conducting focusing servo control and tracking servo control, 107 an LD controller, 108 a spindle motor controller for controlling the rotation of the spindle motor 102 and 109 a data recording and reproducing circuit for recording data on the magneto-optical disk 101 and reproducing data from the magneto-optical disk 101.

Figures 2A, 2B:
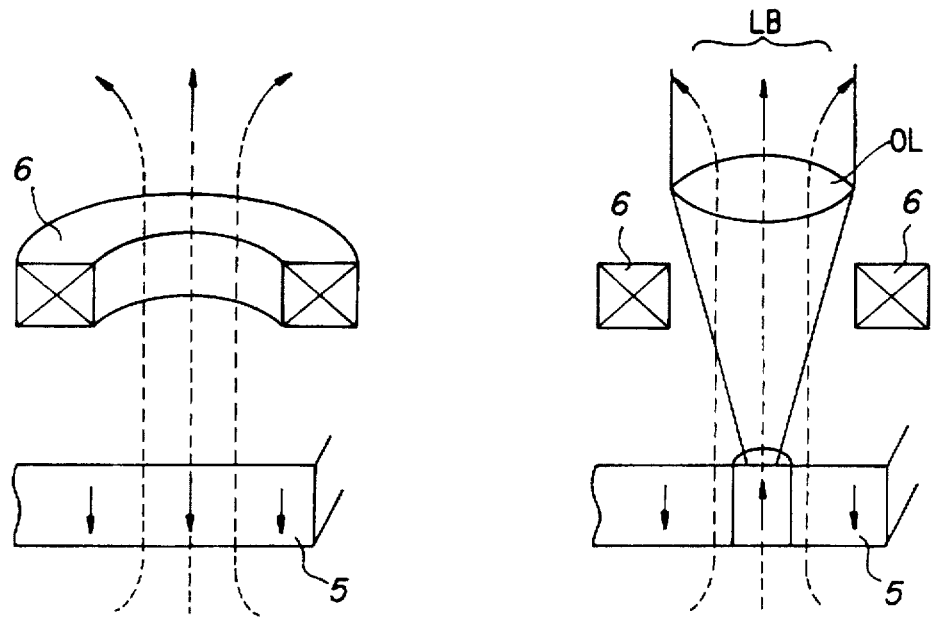
FIGS. 2A to 2C are explanatory views of the principle of the operation of writing and reading data into and from a magneto-optical disk.
Figure 2C:
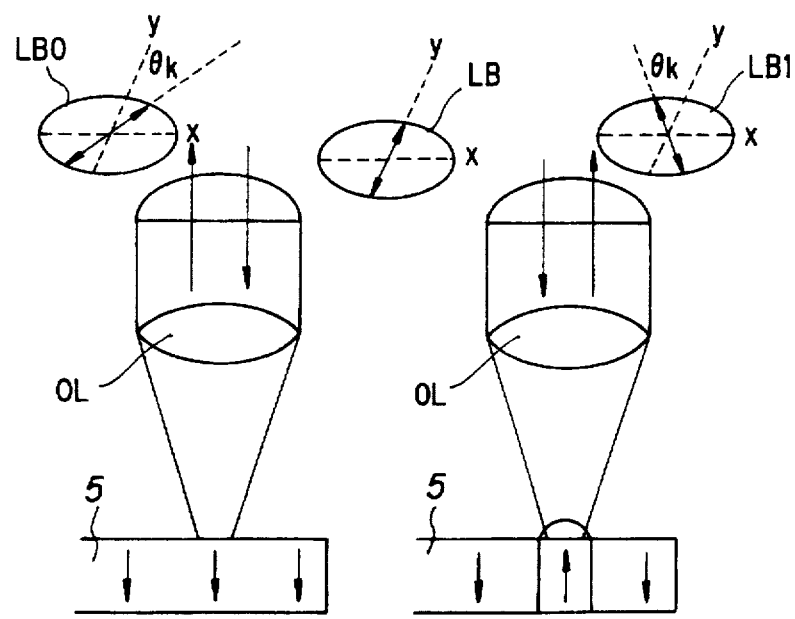
Figure 3A:
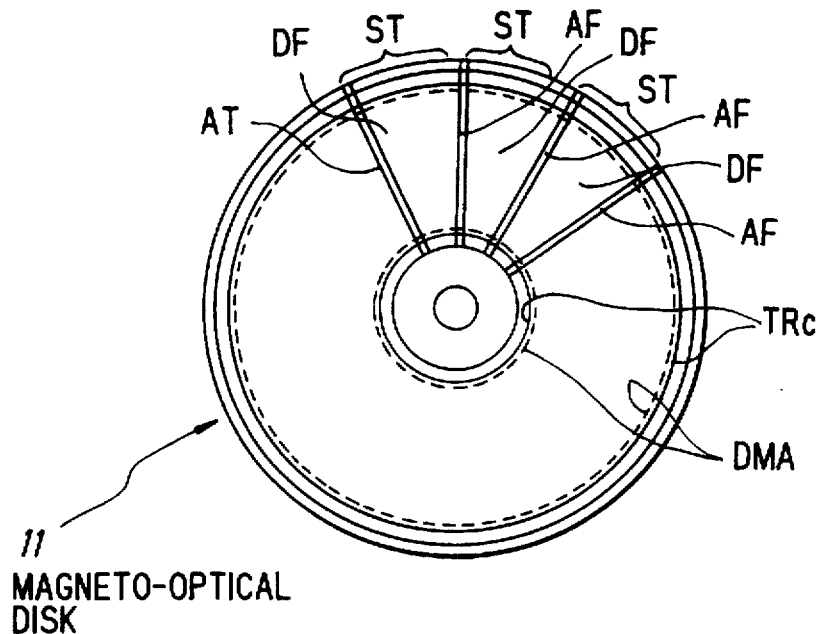
FIGS. 3A and 3B are explanatory views of the structure of a magneto-optical disk medium.
Figure 3B:
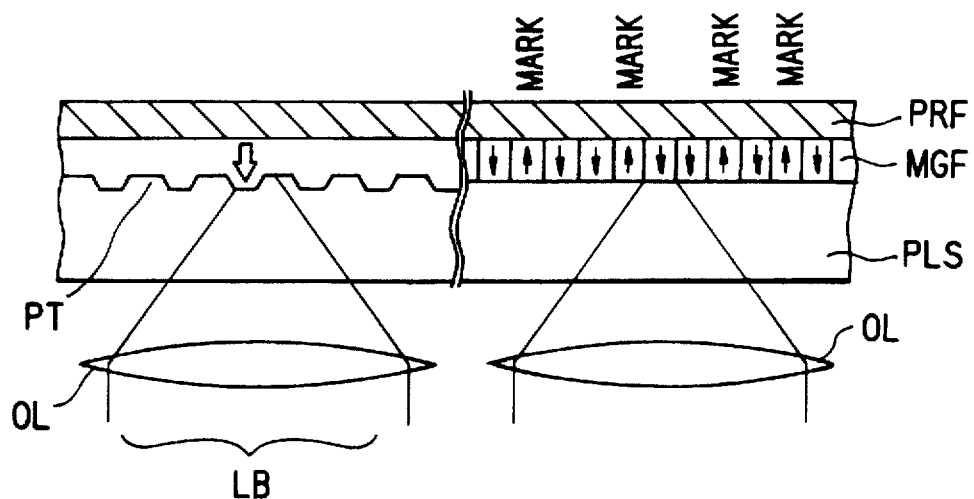
Figure 4:
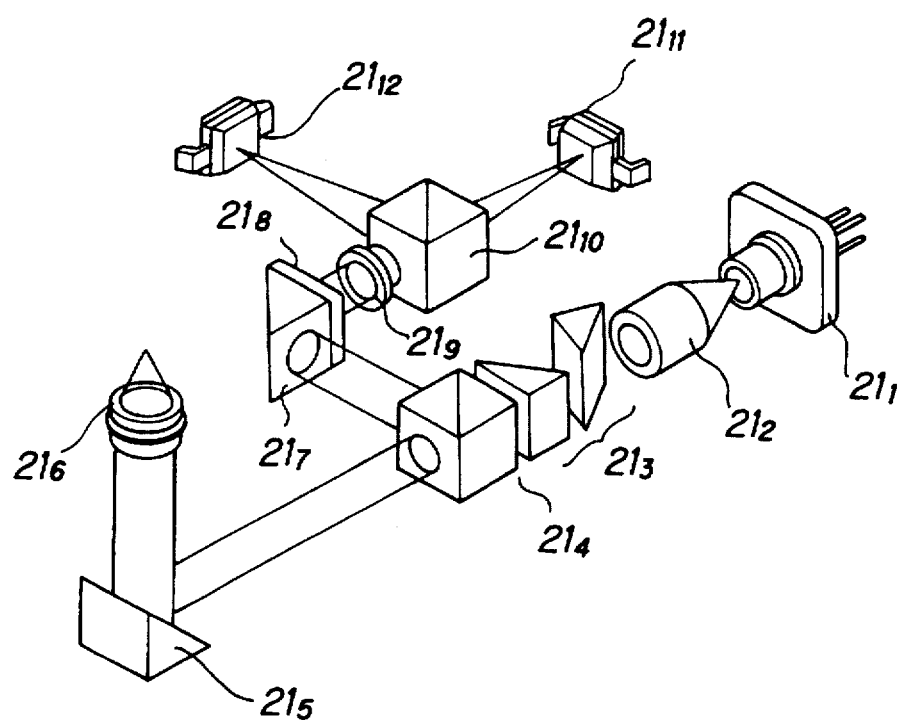
FIG. 4 shows the structure of a magneto-optical head.
Figure 6:
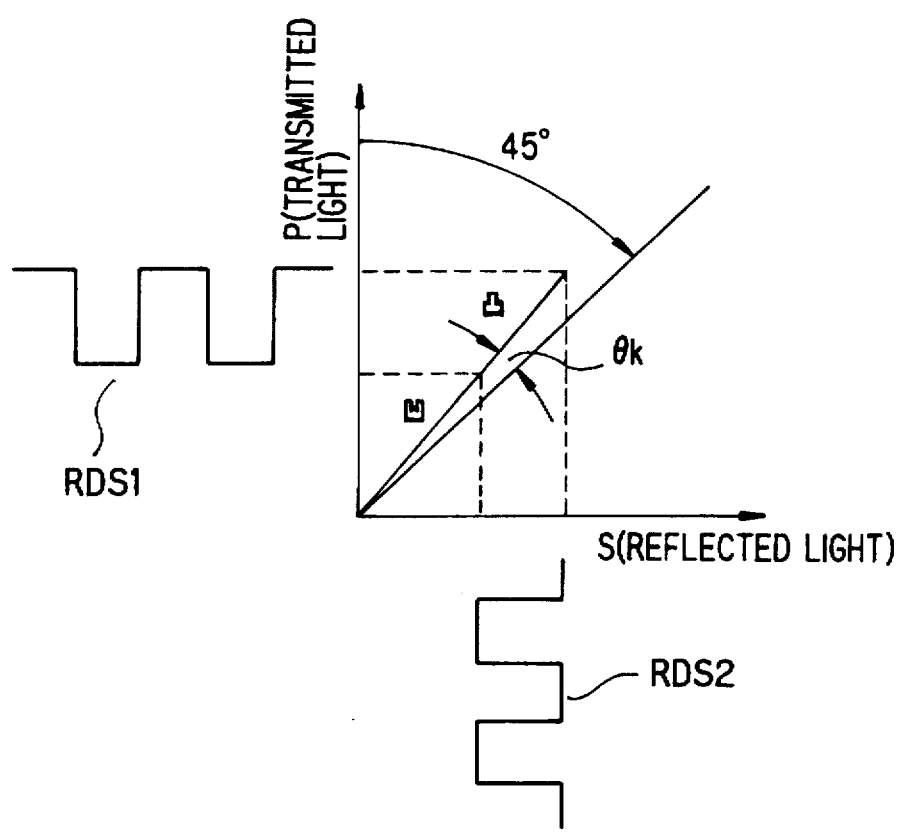
FIG. 6 explain the principle of the operation of reading the preformat information.
Figure 7:
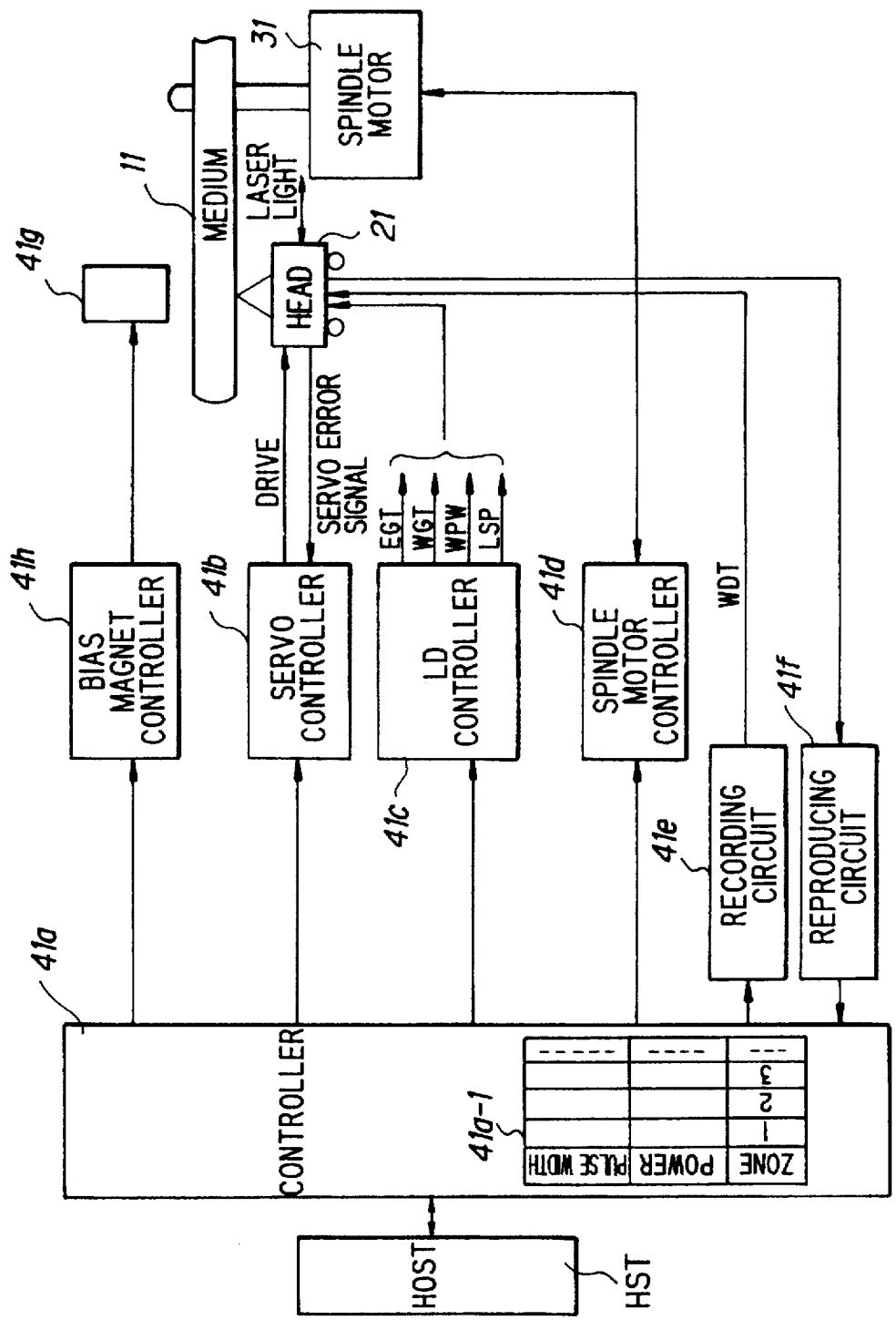
FIG. 7 shows the structure of a conventional magneto-optical disk apparatus.
Figure 8:
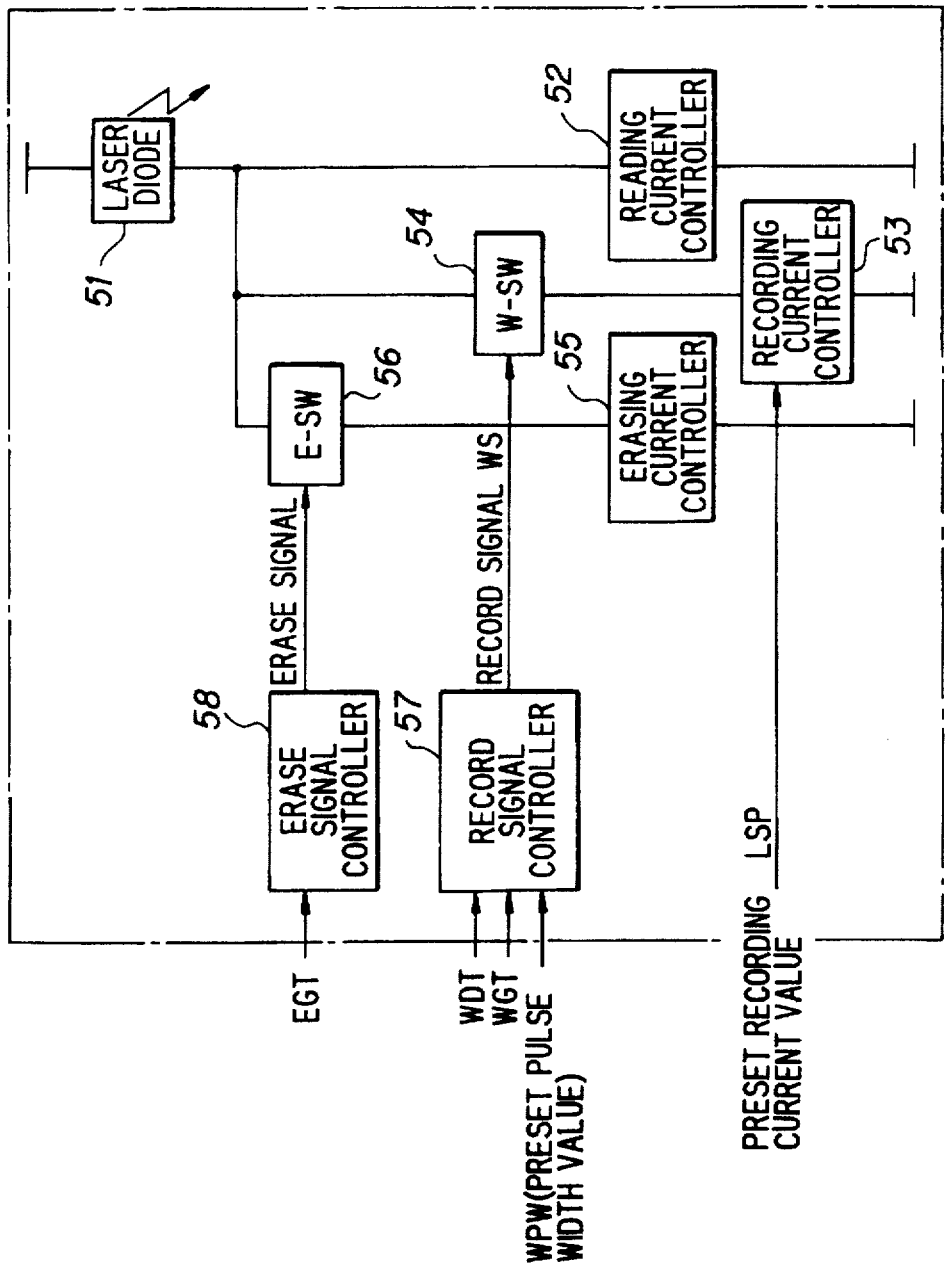
FIG. 8 shows the structure of a conventional laser diode driving circuit.

While the magneto-optical disk 101 is rotated at a constant rotational speed, laser light is converged on a substantially circular spot and projected onto the disk surface so as to record marks. Marks (corresponding to "1" of data) are recorded at a sufficiently narrow pulse width of a record signal and with a constant recording power of the laser light. Marks are recorded on the entire surface of the disk at the same recording pulse width and with the same recording power. The pulse width of the record signal is set at not more than 30% of the mark interval obtained when the marks are recorded on the magneto-optical disk at the highest density. The recording power is set so that the amplitude of a reproduction signal is the largest when the marks are recorded on the magneto-optical disk at the highest density.

In this manner, since data are recorded on the same conditions from the inner peripheral portion to the outer peripheral portion, the hardware and the software for setting and changing the recording conditions, which are necessary in the related art, are obviated and, nevertheless, it is possible to record data on the magneto-optical disk at a high speed under simple control.

(b) Investigation of recording conditions

Recording conditions were investigated in the recording system for recording information on the magneto-optical disk by the presence or absence of a mark ("1" or "0"), and the following conclusion is attained:

"If the pulse width of a recording signal is sufficiently small, the necessary recording power (sensitivity) is constant irrespective of the travelling speed (linear velocity) of the disk."

The process for drawing this conclusion is as follows.

(i) It is now assumed that a beam having a very small diameter is projected to a stationary medium at a very short pulse T0 having power of P0. The energy (T0×P0) projected to a certain point of the medium is diffused in a short time by heat conduction and the temperature at that point is lowered. In the course of heat diffusion, some region around the point to which the beam is projected is heated higher than a temperature which is necessary for recording, and a mark is formed at this region. In this case, if a certain degree of energy is projected, it is possible to form a mark having a certain degree of size (diameter a) even if the diameter of the light beam is small.

At the time of recording on a medium, the medium is heated by light energy and a rise in the temperature is utilized for recording a mark. It is therefore possible in principle to record a mark of the same size if the total energy is the same (T×P=constant). This principle holds when the time of heat diffusion is sufficiently long in comparison with the pulse width T of the beam. On the other hand, when the time of heat diffusion is short in comparison with the pulse width T of the beam, this principle does not hold. It is clear that if the energy given in a unit time is the same as the energy which diffuses in the unit time, the temperature does not rise however long the beam may be projected.

(ii) If the phenomenon (i) is reconsidered, it is found that a mark having a certain degree of size can be formed even by using a beam spot having a small diameter and that a mark having the same size can be formed if the energy (pulse width T×power P) is constant so long as the pulse width is smaller than the time of the heat diffusion.

(iii) The case in which the medium moves at a velocity of v will now be considered. The projected beam moves on the medium by T×v. When the distance T×v of movement is sufficiently smaller than the diameter a, the heat projected is considered to be concentrated on approximately the center of the diameter a. Consequently, the mark formed is considered to have approximately the same diameter as a.

(iv) The beam diameter is assumed to be small in (iii). However, since the central part has the highest strength in an actual beam, the hypothesis (iii) will also hold even if the beam has a certain degree of diameter.

(v) If this hypothesis holds, in other words, if a sufficiently short pulse is used, it is not necessary to change the recording conditions at any point of the medium and at any travelling speed of the medium.

For example, the case of rotating the magneto-optical disk having a diameter of 90 mm at a rotational speed of 3600 rpm will be considered. When this medium is used, the linear velocity (peripheral speed) of the medium is about 9 m/s on the innermost periphery, and about 15 m/s on the outermost periphery. At this time, the amount of movement of the medium on the innermost periphery (9 m/s) which moves at a pulse width of 15 ns to 55 ns is shown in FIG. 9 as compared with that on the outermost periphery (15 m/s). The length of the smallest mark is 0.75 μm. It is clear from FIG. 9 that if the pulse width is large, the light is projected to a longer distance (=0.825 μm) than the length of the mark, while if the pulse width is small, the light is projected to a shorter distance than the length of the mark.

Figure 10:
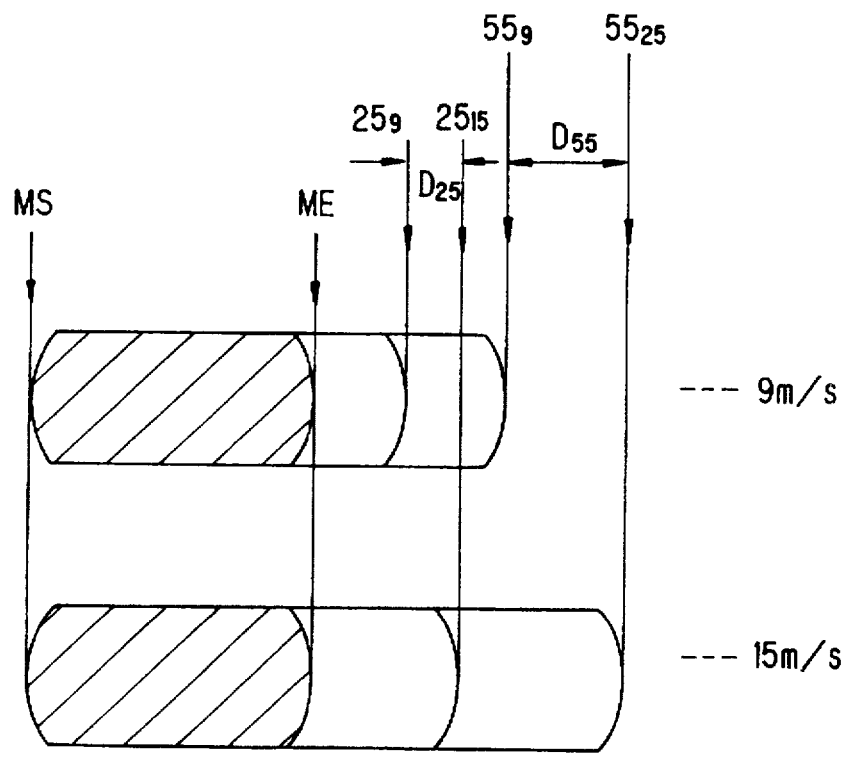
FIGS. 10A and 10B are explanatory views of the recording conditions.

FIGS. 10A and 10B show the values in the table in FIG. 9 in the from of a diagram. The marks formed when the recording pulse width is 25 ns and when the recording pulse width is 55 ns are shown on the basis of the mark recorded when the medium is stationary. In FIG. 10A, the linear velocity is 9 m/s, and in FIG. 10B, it is 15 m/s. The hatched potion shows the mark recorded when the medium is stationary, wherein the symbols MS, ME represent the head end and the tail end, respectively, of the mark. The reference numerals $25_9$, $25_{15}$ represent the tail end of the marks recorded when the medium (mark) moves at the linear velocity of 9 ms and 15 m/s, respectively, during the period of 25 ns, and the reference numerals $55_9, 55_{15}$ represent the tail end of the marks recorded when the medium (mark) moves at the linear velocity of 9 m/s and 15 m/s, respectively, during the period of 55 ns.

When the marks produced at the linear velocities of 9 m/s and 15 m/s are compared, the larger the recording pulse width (55 ns), the larger the difference in the mark length, and the smaller the recording pulse width (25 ns), the smaller the difference in the mark length. If the pulse width is even smaller than 25 ns/, the difference in the mark length is reduced closer to that when the medium is stationary. As a result, it is presumed that if a sufficiently narrow recording pulse is used, it is not necessary to change the recording conditions at any position of the medium and at any travelling speed of the medium.

In order to confirm the above presumption, the following experiments were conducted.

(c) Experiments on recording conditions

A commercially available magneto-optical disk (FIG. 11) was used for the experiments. The magneto-optical disk is composed of a polycarbonate substrate 11a with a laser light guide groove formed therein, a dielectric film 11b having a refractive index of about 2, a perpendicular magnetic thin film 11c of an amorphous alloy of rare earth-transition metal, a dielectric film lid and a reflective film 11e sputtered/ deposited in that order, and a resin protective film 11f covering the laminate. The dielectric films 11b, 11d, the perpendicular magnetic thin film 11c and the reflective film lie are composed of silicon nitride SiN, TbFeCo, and aluminum Al, respectively. The amorphous alloy of rare earth-transition metal for the perpendicular magnetic thin film 11c is not restricted to TbFeCo, but other materials such as DyFeCo, TbDyFeCo, GdDyFeCo, NdDyFeCo and GdTbFeCo are also usable.

As a measuring apparatus, an optical disk tester using a laser diode having a wavelength of 780 nm as a light source was used. The NA of the objective lens was 0.53, and the radius of the laser beam converged on the spot was 0.78 µm. The rotational frequency of the spindle was variable up to 3600 rpm, and the maximum laser power at the recording film was 18 mW. According to the measuring apparatus, it is possible to record a mark on a medium at any given pulse width by inputting a binary light emission pattern from an external equipment. Marks were recorded by a (2, 7) RLL mark position system at a constant recording frequency of 6.00 MHz in such a manner that the mark interval was about 1.5 µm and the mark length was about 0.75 µm when the marks were recorded in the innermost peripheral portion, i.e., at the highest density. The mark interval is the interval between the centers of adjacent marks and the mark length is the length (diameter) of a mark. These values vary among measuring apparatuses.

Marks were recorded at a constant pulse width of a record signal while varying the rotational speed of the magneto-optical disk medium, and after recording, the amplitude of the reproducted signal was measured so as to examine the dependence of the amplitude on the recording power. The results are shown in FIGS. 12 to 15.

(c-1) When the recording pulse width was 25 ns

Figure 12:
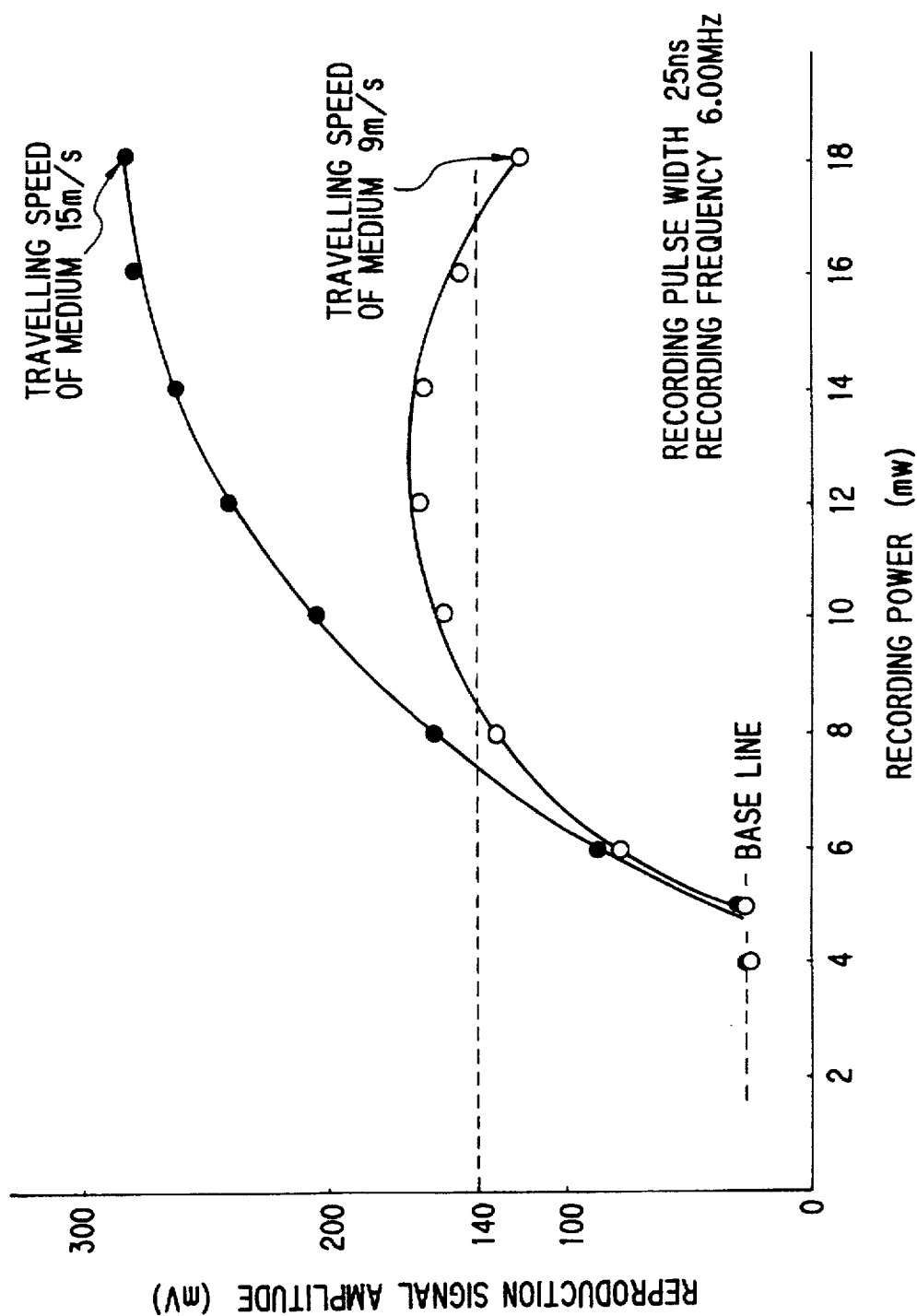
FIG. 12 shows the characteristic curves of the recording power.reproduction signal amplitude when the recording pulse width is 25 nano second (ns)

In FIG. 12, the change in the amplitude of the reproducted signal was plotted at a recording pulse width of 25 ns while varying the recording power. It is clear from FIG. 12 that when the pulse width was 25 ns, the dependency of the recording power at the rising portion of the amplitude of the reproducted signal was substantially the same even if the travelling speed of the medium was changed from 9 m/s to 15 m/s. However, when the travelling speed was 9 m/s, the increase in amplitude became smaller due to the bit interference as the recording power was increased, and when the recording power exceeded 15 mW, the amplitude was lowered. In this case if it is assumed that the range in which the amplitude of the reproducted signal is good is not less than 140 mV, the appropriate range of the recording power is about 8 mW to 17 mW. If the recording power is set at 12.5 mW, there is a margin of ±4.5 mW, which makes it possible to record data satisfactorily even if the ambient temperature changes from a low temperature (0° C.) to a high temperature (60° C.).

Figure 13:
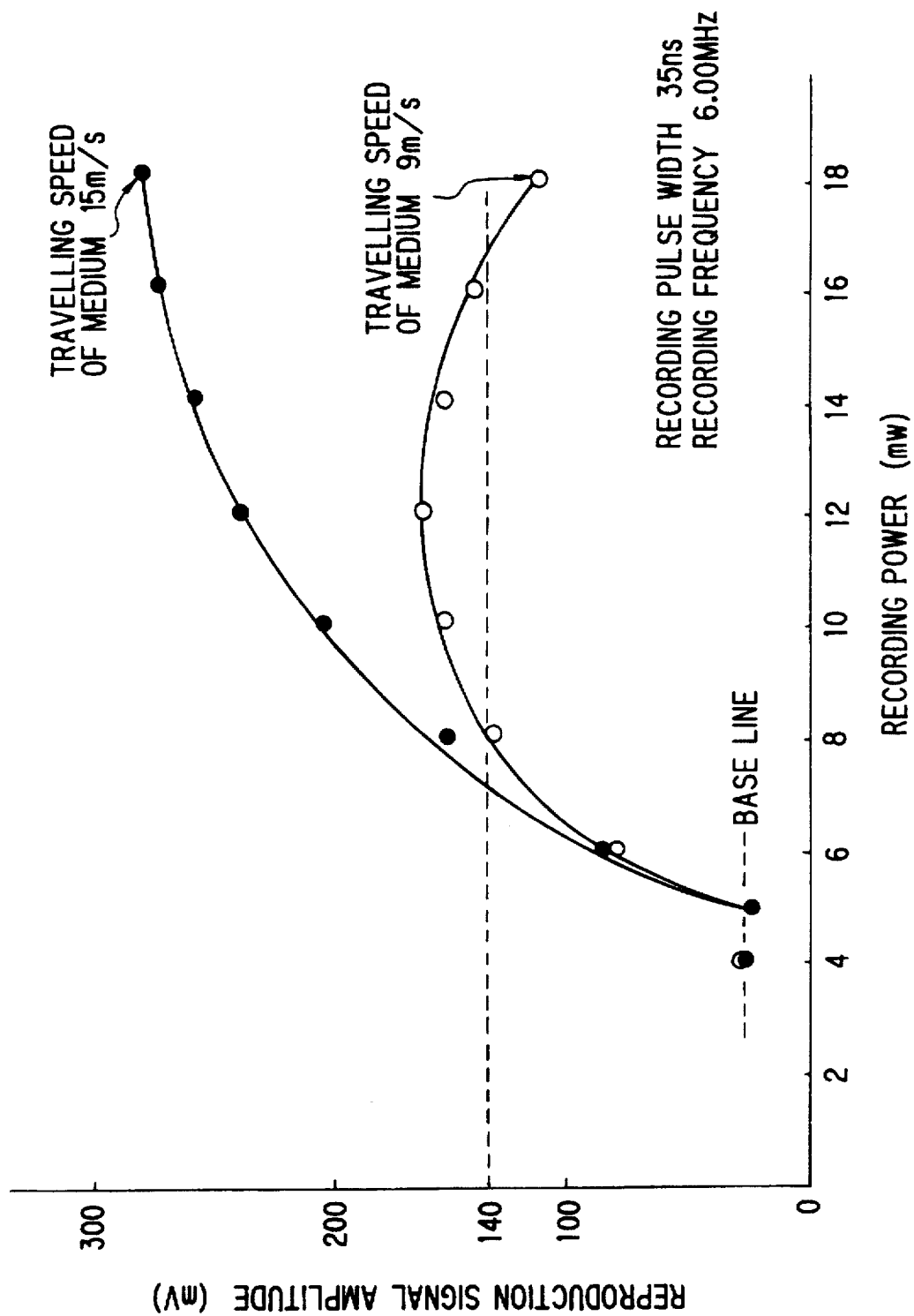
FIG. 13 shows the characteristic curves of the recording power.reproduction signal amplitude when the recording pulse width is 35 ns.
Figure 14:
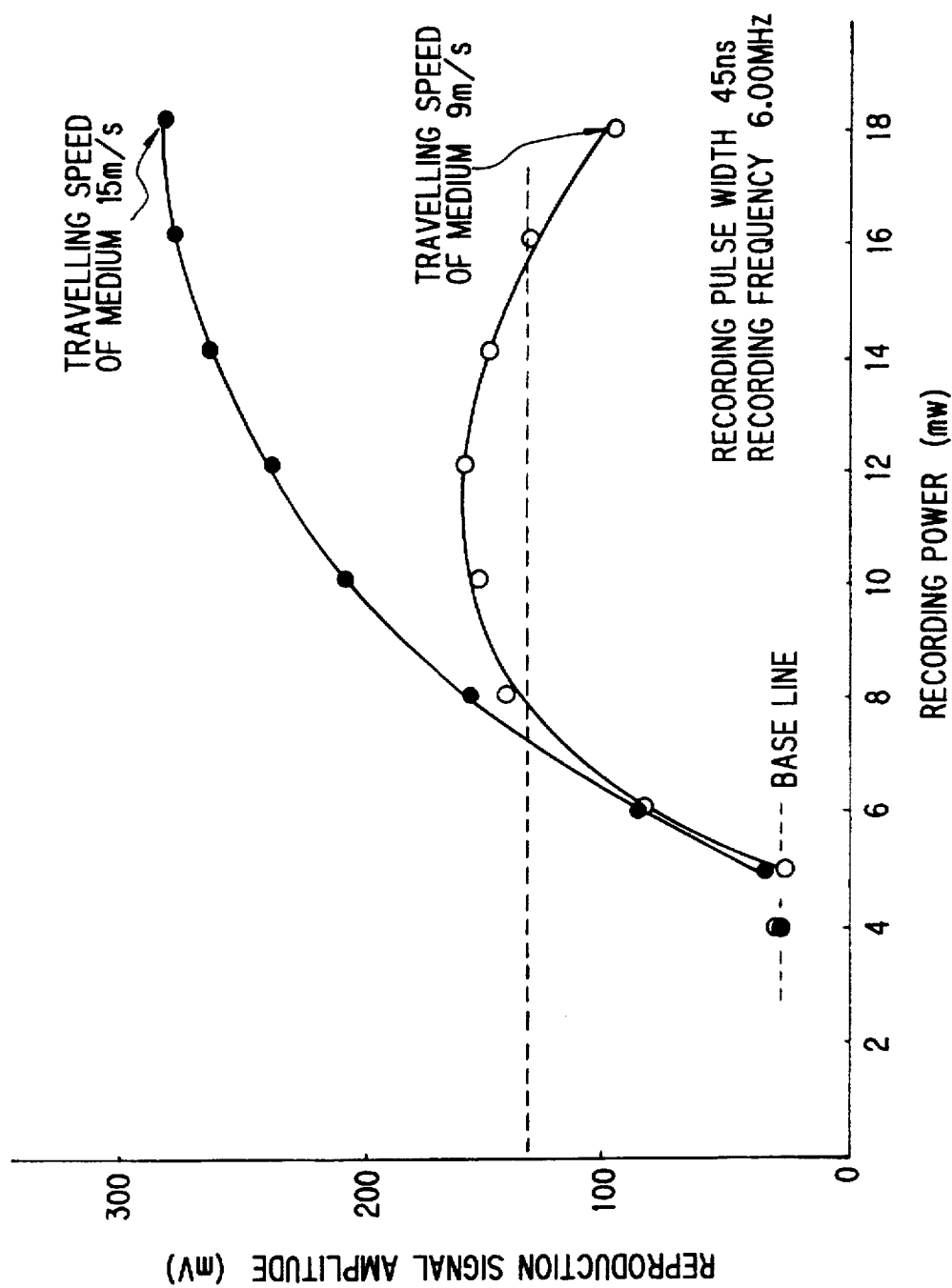
FIG. 14 shows the characteristic curves of the recording power.reproduction signal amplitude when the recording pulse width is 45 ns.
Figure 15:
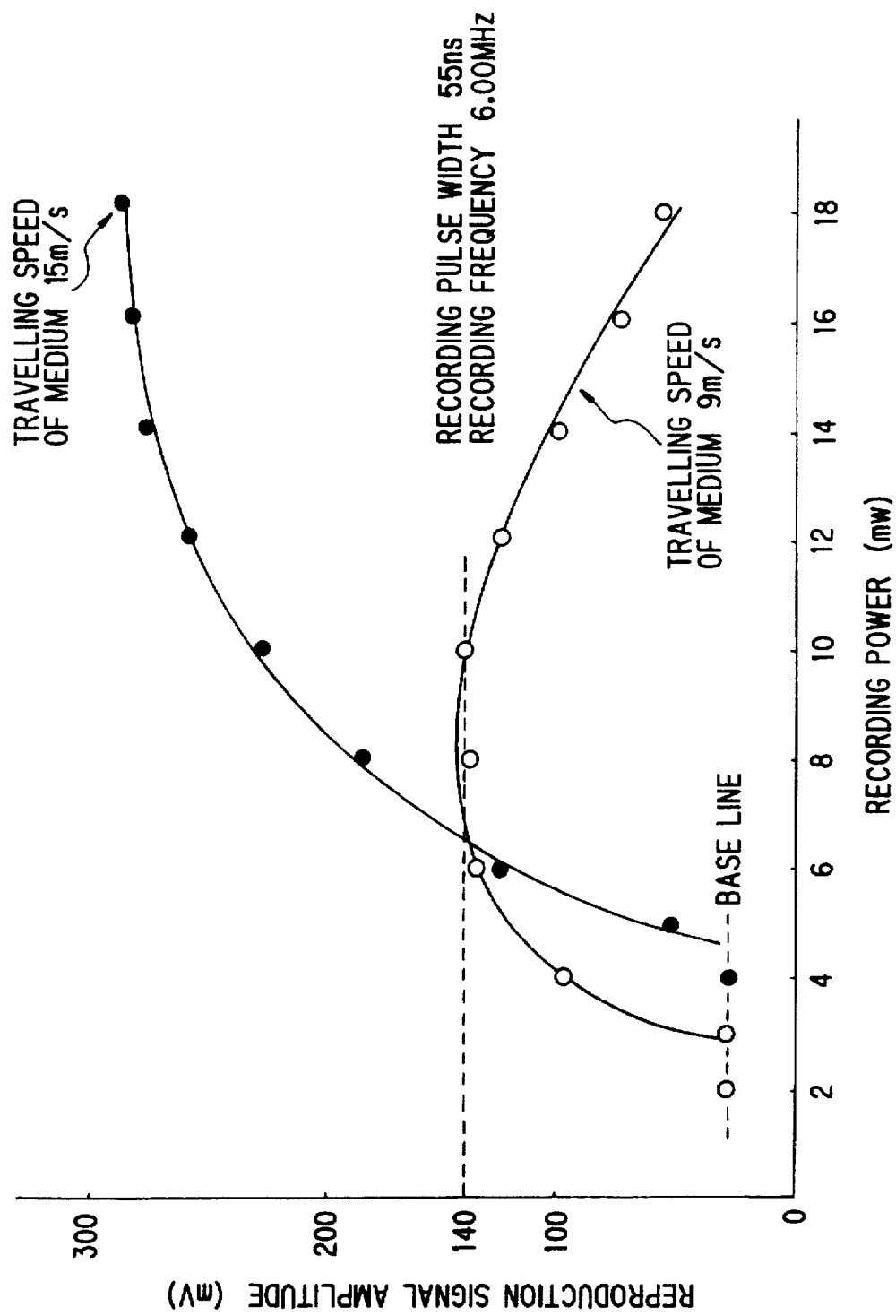
FIG. 15 shows the characteristic curves of the recording power.reproduction signal amplitude when the recording pulse width is 55 ns.

FIGS. 13 to 15 show the results of measurements on the same conditions as in FIG. 12 except that the pulse width was changed to 35 ns, 45 ns and 55 ns, respectively. It is clear from FIG. 15 that when the pulse width was 55 ns, the dependency of the recording power at the rising portion of the amplitude of the reproduction signal changes between when the travelling speed of the medium was 9 m/s and when it was 15 m/s. In other words, the sensitivity changed in accordance with the linear velocity. In this case if it is assumed that the range in which the amplitude of the reproduction signal is good is not less than 140 mV, the appropriate range of the recording power is only about 7 mW to 10 mW. Due to this narrow range, when the ambient temperature is in the vicinity of a low temperature or a high temperature, the amplitude is lowered below 140 mV, which makes it difficult to record marks in the inner peripheral portion and the outer peripheral portion on the same conditions (same recording power, same recording pulse width).

From these experiments it is considered that if the travelling speed of the medium is in the range of 9 to 15 m/s, the pulse width of not more than 45 ns is regarded as narrow enough to enable recording on the same recording conditions. If the recording pulse width of 25 ns to 45 ns in the innermost peripheral portion (linear velocity 9 m/s) is calculated in terms of a length in accordance with the table shown in FIG. 9, it is 0.225 to 0.405 µm, which is 15 to 27% of the mark interval (1.5 µm) in the innermost peripheral portion. As a result, it is considered that the recording pulse width which is regarded as sufficiently narrow is less than about 30% of the mark interval in the innermost peripheral portion in which the marks are recorded at the highest density. If this recording pulse width is represented with respect to the mark length (0.75 µm), it can be said that the appropriate recording pulse width is less than about 60% of the mark length although the mark length varies to a some extent. The recording power is set so that the maximum amplitude of the reproduction signal is obtained in the innermost peripheral portion in which marks are recorded at the highest density.

Figure 16:
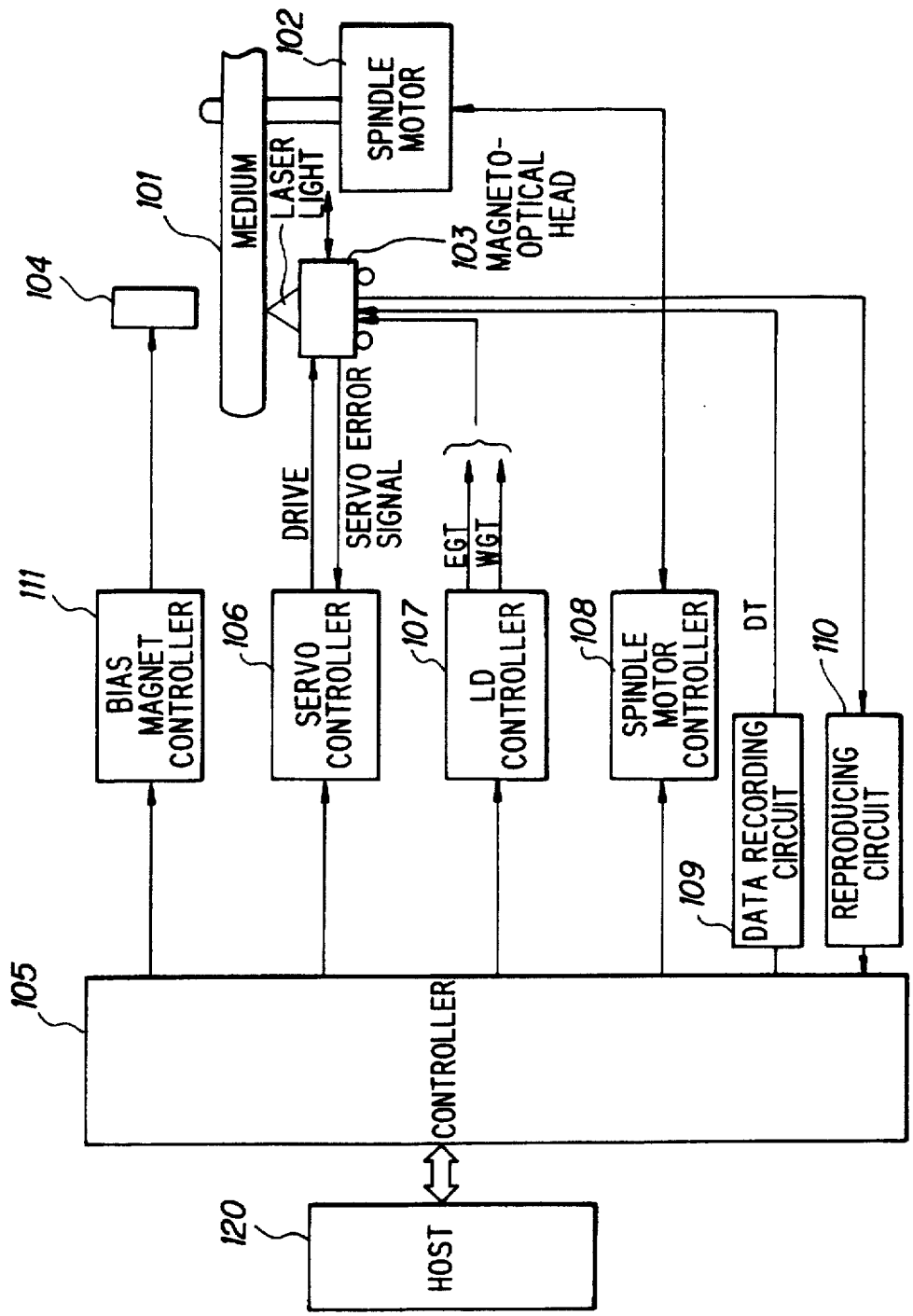
FIG. 16 is shows an embodiment of a magneto-optical disk apparatus according to the present invention.
Figure 17:
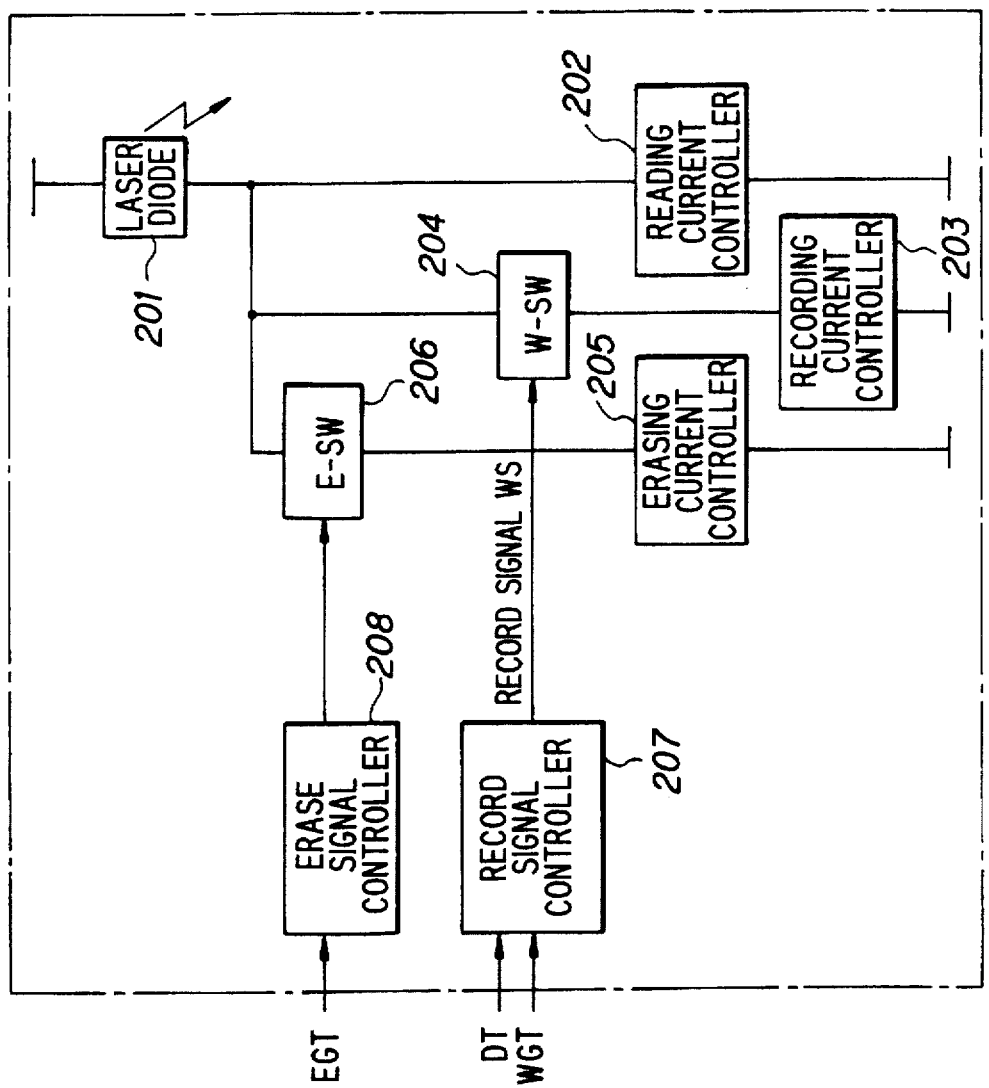
FIG. 17 shows the structure of a laser diode driving circuit in accordance with the present invention.

(d) Structure of magneto-optical disk of the invention FIG. 16 shows an embodiment of a magneto-optical disk according to the present invention, and FIG. 17 shows the structure of a laser diode driving circuit. In FIG. 16, the reference numeral 101 represents a magneto-optical disk, 102 a spindle motor, 103 a magneto-optical head, 104 a bias magnet, 105 a controller for controlling the entire apparatus, 106 a servo controller for positioning the magneto-optical head 103 at a predetermined position in accordance with the instruction from the controller 105 and conducting focusing servo control and tracking servo control, 107 an LD controller, 108 a spindle motor controller for controlling the rotation of the spindle motor 102, 109 a data recording circuit for recording data on the magneto-optical disk 101, 110 a reproducing circuit for reproducing the data read from the magneto-optical disk 101, 111 a bias magnet controller and 120 a host.

In FIG. 17, the reference numeral 201 represents a laser diode, 202 a reading current controller, 203 a recording current controller, 204 a write switch, 205 an erasing current controller, 206 an erase switch, 207 a record signal controller and 208 an erase signal controller.

Each of the current controllers 202, 203 and 205 controls the reading current, the recording current and the erasing current, respectively. Especially, the recording current controller 203 so controls the recording current as to have a preset current value. The record signal controller 207 outputs a record signal WS having a preset pulse width and a constant recording frequency on the basis of writing data DT when data is written (when a write gate signal WGT is on). The write switch 204 is turned on/off in accordance with the record signal WS, thereby turning on/off the laser light. The erase signal controller 208 turns on the erase switch 209 so as to erase a predetermined sector at the time of erasing (when the erase gate signal EGT is on).

The recording current controller 203 and the record signal controller 207 are so adjusted in advance as to have the recording current value (recording power) and the pulse width which make it possible to record marks on the same recording conditions from the inner peripheral portion to the outer peripheral portion. The recording power and the pulse width of the record signal are set at, for example, 12 mW and 25 ns, respectively.

When the controller 105 receives data write command (write command, write data) from the host 120, the servo controller 106 positions the magneto-optical head 103 at the designated sector, and the LD controller 107 supplies the erase gate signal EGT issues so as to erase the designated sector. The controller 105 then produces the write gate signal WGT from the LD controller 107 and the write data DT from the data recording circuit 109. The record signal controller 207 (FIG. 17) produces the record signal WS having the preset pulse width at a constant recording frequency on the basis of the write data DT when the write gate signal WGT is on, and writes the data into the magneto-optical disk 101 by turning on/off the laser light with the preset recording power.

After the end of writing, the controller 105 positions the magneto-optical head 103 at the designated sector again, and checks whether or not the recorded data is right. If the data is correct, the controller 105 informs the host HST of the normal execution of the write command, while if the data is not correct, the controller 105 informs the host of the abnormal execution of the write command.

As described above, a magneto-optical disk apparatus according to the present invention need not control the power of the laser light or the pulse width of a record signal unlike in a conventional apparatus. Therefore, the structures of the recording current controller 203 and the record signal controller 207 are simpler than those in the conventional apparatus, and the ROM for storing the recording power and the recording pulse width for each zone is obviated. In addition, the conventional controlling process for judging to which zone the designated sector belongs and switching the recording power and the recording pulse width on the basis of the judgment is not necessary, which leads to simple and high-speed record control.

In this embodiment, the present invention is applied to a magneto-optical disk, but the present invention is also applicable to other optical disks.

(e) Modification

In the above-described embodiment, the optical disk is not divided into zones at the time of recording. It is also possible to divide the optical disk into a plurality of zones and to record marks at a different frequency for each zone. The pulse width of the recording pulse for each zone is set to be sufficiently narrow in comparison to the mark length or mark interval obtained when the marks are recorded in the innermost peripheral portion of the corresponding zone at the highest density. For example, if the entire disk surface of the optical disk is divided into about 10 zones and marks are recorded by the laser light whose pulse width is sufficiently narrow in comparison with the mark length or mark interval obtained when the marks are recorded in the innermost peripheral portion of the corresponding zone at the highest density, no bit interference is caused at the innermost peripheral portion of each zone. In this case, when marks are recorded at the highest density from the innermost peripheral portion to the outermost peripheral portion, the recording frequency is varied for each zone in the range of about 6.90 MHz to 12.00 MHz. In this manner, since the recording frequency is increased in proportion to the distance from the center of the disk, high-density recording is enabled.

As explained above, according to the optical disk apparatus of the present invention, since marks (corresponding to "1") are recorded at the same recording pulse width, which is sufficiently small, and with same recording power of the laser light, which is maintained at a constant value, on the entire surface of a disk, the hardware and the software for setting and changing the recording conditions, which are necessary in the related art, are obviated, thereby making it possible to record on an optical disk with advantages in respect of cost and under simple control.

According to the optical disk apparatus of the present invention, since it is not necessary to control the recording power and the recording pulse width for each zone prior to writing, high-speed recording is enabled.

In addition, when the optical disk is divided into a plurality of zones and marks are recorded at a different frequency for each zone, since the recording pulse width for each zone is set at a sufficiently narrow pulse with respect to the mark length or mark interval obtained when the marks are recorded in the innermost peripheral portion of the corresponding zone at the highest density, no bit interference is caused at the innermost peripheral portion of each zone. In addition, since the recording frequency is increased in proportion to the distance from the center of the disk, high-density recording is enabled.

As many apparently widely different embodiments of the present invention can be made without departing from the spirit and scope thereof, it is to be understood that the invention is not limited to the specific embodiment thereof except as defined in the appended claims.

What is claimed is:

1. An optical disk apparatus for recording information by the presence and the absence of a mark, comprising:

rotating means for rotating an optical disk; and recording means for recording marks by irradiating a surface of said optical disk with laser light which is emitted from a laser light source by inputting a single recording pulse for each mark to be recorded to said laser light source, wherein said recording means records said marks with constant recording energy obtained by making recording power of said laser light constant, and wherein said recording means further records said marks with a constant width recording pulse for any regions of said optical disk from an inner peripheral side to an outer peripheral side thereof.

2. An optical disk apparatus according to claim 1, wherein said recording means sets said pulse width of the recording pulse so that the amount of movement of said laser light with respect to said optical disk at a predetermined peripheral speed during the period of said pulse width is sufficiently short in comparison to the length of the mark or the interval between the adjacent marks which are recorded on said optical disk.

3. An optical disk apparatus according to claim 1, wherein said recording means sets said pulse width of the recording pulse so that the amount of movement of said laser light with respect to said optical disk at a predetermined peripheral speed during the period of said pulse width is sufficiently short in comparison to the length of the mark or the interval between the adjacent marks which are recorded on the innermost peripheral portion of said optical disk at the highest density.

4. An optical disk apparatus according to claim 1, wherein said recording means sets said pulse width of the recording pulse so that the amount of movement of said laser light with respect to said optical disk at a predetermined peripheral speed during the period of said pulse width is less than about 60% of the length of the mark recorded on said optical disk.

5. An optical disk apparatus according to claim 1, wherein said recording means sets said pulse width of the recording pulse so that the amount of movement of said laser light with respect to said optical disk at a predetermined peripheral speed during the period of said pulse width is less than about 30% of the length of the mark recorded on said optical disk.

6. An optical disk apparatus according to claim 1, wherein said recording means sets the recording power so that the amplitude of signal which is reproducted from the optical disk is more than a predetermined value in case of that said marks are recorded on said optical disk at the highest density.

7. An optical disk apparatus for recording information by the presence and the absence of a mark, comprising:

rotating means for rotating an optical disk; and recording means for recording marks by irradiating a surface of said optical disk with laser light emitted from a laser light source by inputting a single recording pulse for each mark to be recorded to said laser light source, wherein said optical disk is divided into a plurality of zones, and said recording means records said marks at a different frequency in each zone, and sets the pulse width of the recording pulse so that the amount of movement of said laser light with respect to said optical disk at a predetermined peripheral speed in each zone during the period of said pulse width is sufficiently short in comparison to the length of the mark or the interval between the adjacent marks which are recorded on an innermost peripheral portion of said each zone at highest density.

8. An optical disk apparatus for recording a mark onto a surface of an optical disk, comprising:

rotating means for rotating the optical disk at a constant rotational speed;

recording means for recording a mark by irradiating the surface of the optical disk with a laser light corresponding to a single recording pulse having a constant pulse width, the laser light having a recording power and a recording pulse width; and means for maintaining as constant the recording power and the recording pulse width of the laser light corresponding to the single recording pulse in any region of the optical disk from an inner peripheral side to an outer peripheral side thereof.

9. An optical disk apparatus according to claim 8, wherein said recording means sets said pulse width of the recording pulse so that the amount of movement of said laser light with respect to said optical disk at a predetermined peripheral speed during the period of said pulse width is less than about 60% of the length of the mark recorded on said optical disk.

10. An optical disk apparatus according to claim 8, wherein said recording means sets said pulse width of the recording pulse so that the amount of movement of said laser light with respect to said optical disk at a predetermined peripheral speed during the period of said pulse width is less than about 30% of the length of the mark recorded on said optical disk.

11. An optical disk apparatus for recording a mark onto a surface of an optical disk, comprising:

rotating means for rotating the optical disk at a constant rotational speed; and means for recording a mark by irradiating the surface of the optical disk with a laser light corresponding to a single recording pulse having a constant pulse width, the laser light having a recording power and recording pulse width, wherein the laser light irradiated from said recording means in accordance with the single recording pulse is held at a constant recording power and a constant recording pulse width in any region of the optical disk from an inner peripheral side to an outer peripheral side thereof.

12. An optical disk apparatus according to claim 11, wherein said recording means sets said pulse width of the recording pulse so that the amount of movement of said laser light with respect to said optical disk at a predetermined peripheral speed during the period of said pulse width is less than about 60% of the length of the mark recorded on said optical disk.

13. An optical disk apparatus according to claim 11, wherein said recording means sets said pulse width of the recording pulse so that the amount of movement of said laser light with respect to said optical disk at a predetermined peripheral speed during the period of said pulse width is less than about 30% of the length of the mark recorded on said optical disk.

14. An optical disk apparatus according to claim 11, wherein said recording means sets said pulse width of the recording pulse so that the amount of movement of said laser light with respect to said optical disk at a predetermined peripheral speed during the period of said pulse width is less than about 60% of the length of the mark recorded on said optical disk.

15. An optical disk apparatus according to claim 11, wherein said recording means sets said pulse width of the recording pulse so that the amount of movement of said laser light with respect to said optical disk at a predetermined peripheral speed during the period of said pulse width is less than about 30% of the length of the mark recorded on said optical disk.

16. An optical disk apparatus for recording a mark onto a surface of an optical disk which is divided into a plurality of zones in a radial direction of the optical disk, comprising:

rotating means for rotating the optical disk at a constant rotational speed;

recording means for recording a mark by irradiating the surface of the optical disk with a laser light corresponding to a single recording pulse, the laser light having a recording power and a recording pulse width, the single recording pulse having a plurality of pulse widths each of which is assigned to a specific one of the plurality of zones in the optical disk, and each of the pulse widths of the recording pulse being constant in the respective zone in the optical disk; and means for maintaining as constant the recording power and the recording pulse width of the laser light corresponding to the single recording pulse in any region in the respective zones in the optical disk.

17. An optical disk apparatus for recording a mark onto a surface of an optical disk which is divided into a plurality of zones in a radial direction of the optical disk, comprising:

rotating means for rotating the optical disk at a constant rotational speed; and means for recording a mark by irradiating the surface of the optical disk with a laser light corresponding to a single recording pulse, the laser light having a recording power and a recording pulse width, the single recording pulse having a plurality of pulse widths each of which is assigned to a specific one of the plurality of zones in the optical disk, and each of the pulse widths of the recording pulse being constant in the respective zone in the optical disk;

wherein the laser light irradiating from said recording means in accordance with the single recording pulse has a constant recording power and a constant recording pulse width within any region in the respective zones in the optical disk.

18. An optical disk apparatus according to claim 17, wherein said recording means sets said pulse width of the recording pulse so that the amount of movement of said laser light with respect to said optical disk at a predetermined peripheral speed during the period of said pulse width is less than about 60% of the length of the mark recorded on said optical disk.

19. An optical disk apparatus according to claim 17, wherein said recording means sets said pulse width of the recording pulse so that the amount of movement of said laser light with respect to said optical disk at a predetermined peripheral speed during the period of said pulse width is less than about 30% of the length of the mark recorded on said optical disk.

* * * * *